(12) United States Patent
Charlson

(10) Patent No.: US 9,497,323 B2
(45) Date of Patent: Nov. 15, 2016

(54) SYSTEM AND METHOD FOR CALL DISTRIBUTION

(71) Applicant: Joseph Charlson, Pittsburgh, PA (US)

(72) Inventor: Joseph Charlson, Pittsburgh, PA (US)

( * ) Notice: Subject to any disclaimer, the term of this patent is extended or adjusted under 35 U.S.C. 154(b) by 0 days.

(21) Appl. No.: 15/078,442

(22) Filed: Mar. 23, 2016

(65) Prior Publication Data

US 2016/0277580 A1 Sep. 22, 2016

Related U.S. Application Data

(63) Continuation of application No. 14/668,422, filed on Mar. 25, 2015, now Pat. No. 9,332,118.

(60) Provisional application No. 61/970,078, filed on Mar. 25, 2014.

(51) Int. Cl.
| | |
|---|---|
| *H04M 7/00* | (2006.01) |
| *H04M 3/00* | (2006.01) |
| *H04M 5/00* | (2006.01) |
| *H04M 3/523* | (2006.01) |
| *H04M 3/42* | (2006.01) |
| *H04M 3/51* | (2006.01) |

(52) U.S. Cl.
CPC ....... *H04M 3/5232* (2013.01); *H04M 3/42008* (2013.01); *H04M 3/42042* (2013.01); *H04M 3/5141* (2013.01); *H04M 3/5158* (2013.01); *H04M 3/5166* (2013.01); *H04M 3/5183* (2013.01)

(58) Field of Classification Search
CPC ........... H04L 41/5009; H04L 41/5022; H04L 45/00; H04L 45/308; H04L 51/066; H04L 51/08; H04L 51/18; H04L 67/1002; H04W 45/18; H04W 36/0022; H04W 36/0066; G06F 9/5055; G06F 2209/5015; G06Q 10/06395; G06Q 10/107; G06Q 30/02; G06Q 30/0601; G06Q 30/08; G06Q 40/04
USPC .................. 379/111, 112.07, 112.08, 112.09, 379/112.1, 114.01, 114.02, 114.03, 114.05, 379/114.06, 114.08, 114.09, 121.01, 379/121.02, 133, 134, 221.01, 221.02, 379/265.02, 309, 212.02, 266.03, 265.01; 705/52, 14.1
See application file for complete search history.

(56) References Cited

U.S. PATENT DOCUMENTS

| | | |
|---|---|---|
| 5,832,072 A | 11/1998 | Rozenblit |
| 6,021,428 A | 2/2000 | Miloslavsky |

(Continued)

OTHER PUBLICATIONS

"Siemens HiPath ProCenter Standard and Advanced Suites", Siemens Global network of innovation, 8 pp., copyright date 2003.

(Continued)

*Primary Examiner* — Binh Tieu
(74) *Attorney, Agent, or Firm* — The Webb Law Firm

(57) ABSTRACT

A computer-implemented method for distributing phone calls includes the steps of receiving or initiating a telephone call from or with a caller associated with caller identification information, generating masked caller identification information by masking a portion of the caller identification information, transmitting the masked caller identification information to a plurality of potential call-buyers, determining a call-buyer of the plurality of potential call-buyers to receive the incoming phone call, and storing the caller identification information with the masked caller identification information. A system and computer-readable medium are also disclosed.

28 Claims, 7 Drawing Sheets

(56) References Cited

U.S. PATENT DOCUMENTS

| | | |
|---|---|---|
| 6,829,340 B2 | 12/2004 | Wei |
| 6,850,612 B2 | 2/2005 | Johnson et al. |
| 7,072,643 B2 | 7/2006 | Pines et al. |
| 7,664,242 B2 | 2/2010 | Finkelman et al. |
| 8,370,212 B2* | 2/2013 | Asher ................ G06Q 30/0601 705/26.3 |
| 8,379,818 B2 | 2/2013 | Arsenault et al. |
| 8,626,612 B2 | 1/2014 | Canning et al. |
| 8,750,847 B2 | 6/2014 | Elie et al. |
| 9,119,138 B2* | 8/2015 | Baluja ................ G06Q 30/0601 |
| 2002/0120674 A1 | 8/2002 | Son et al. |
| 2003/0198326 A1 | 10/2003 | Wei |
| 2004/0240659 A1 | 12/2004 | Gagle et al. |
| 2005/0038861 A1* | 2/2005 | Lynn .................... G06Q 10/107 709/206 |
| 2005/0135593 A1 | 6/2005 | Becerra et al. |
| 2008/0065402 A1* | 3/2008 | Sanamrad ............. G06F 9/5055 705/7.41 |
| 2008/0089501 A1 | 4/2008 | Benco et al. |
| 2008/0212767 A1 | 9/2008 | Charlson |
| 2010/0106788 A1* | 4/2010 | Lynn .................... G06Q 10/107 709/206 |
| 2012/0218895 A1* | 8/2012 | Bodnar ............... H04L 41/5009 370/235 |
| 2014/0278953 A1 | 9/2014 | Ismail et al. |
| 2014/0297848 A1* | 10/2014 | Sanamrad ............. G06F 9/5055 709/224 |

OTHER PUBLICATIONS

"Siemens HiPath ProCenter Suites Multimedia Solutions", Siemens Global network of innovation, 4 pp., copyright date 2003.
"Connecting the world—HiPath ProCenter Portfolio", Siemens Global network of innovation, 16 pp., copyright date 2004.
"HiPath ProCenter Attendant Console", 4 pp., copyright Jun. 2006.
"Getaway! HiPath Xpressions V5.0 Advanced Unified Messaging", 6 pp., copyright 2006.

* cited by examiner

SYSTEM AND METHOD FOR CALL DISTRIBUTION

CROSS REFERENCE TO RELATED APPLICATIONS

This application is a continuation of U.S. patent application Ser. No. 14/668,422, filed Mar. 25, 2015, entitled "System and Method for Call Distribution," which claims the benefit to U.S. Provisional Patent Application No. 61/970,078, filed Mar. 25, 2014, entitled "System and Method for Call Distribution," the entire disclosures of which are herein incorporated in their entirety by reference.

BACKGROUND OF THE INVENTION

1. Field of the Invention

The present invention relates to the distribution of a telephone call across multiple buyers or agents. In particular, non-limiting embodiments of the invention apply to sales organizations where calls are distributed to multiple buyers or agents.

2. Description of the Related Art

When a customer calls into a telephone number seeking a potential service provider (e.g., call-buyer) either through direct dial or brokered by a warm call transfer agent or transferred 'blind' by an agent without any 3-party warm introduction, speed is of the essence in terms of decreasing customer hold times and helping to foster a positive emotional state in the mind of the caller. Being able to call out to multiple potential buyers in a near simultaneous manner, staggered manner, or prioritized manner is important. This applies both across competing customers within the same service category, as well as within a company across multiple competing sales agents. In both situations, people are competing to speak with the caller. If everyone were to receive the caller's phone number, everyone would have sufficient information to contact the customer and the value of the caller's information is therefore diminished by the act of transmitting their phone number. Current call marketplace technology is setup for single buyer distribution, or if multiple potential buyers are involved, those systems will sequentially call one call-buyer at a time to try to control the distribution of information and related reduction of value as caller information is presented to multiple buyers. If the caller information is not disclosed, a static or constant number is used in place of all callers' telephone numbers for a given marketing campaign and this same static number is displayed to all competing buyers or competing agents for all calls facilitated on the marketing campaign. When a competing buyer requires geographical information that is normally conveyed by a caller's telephone number to properly route calls, these static or constant phone number calls typically must be connected in a staged method wherein a receptionist or call screening person must answer the call to then properly route the call internally with the buyer organization.

A type of call may be either: i) a "live transfer"/"warm call transfer," meaning a call transferred by a call center agent who introduces the caller to a different agent before dropping off the call; or ii) a directly-dialed consumer call, where the caller dials the number and is directly connected to the sales agent or iii) a "blind transfer" meaning a call transferred by a call center agent into an additional call distribution path without providing any introduction between the caller and the receiving agent. In these types of calls, call suppliers/generators typically will pass one of the following options as the caller identification (Caller ID) telephone number:

Actual Caller ID Number of the Caller: The caller's telephone number is transmitted directly as-is. This is the most common occurrence for a call that is initiated directly by a consumer dialing into an advertised telephone number that is directly connected with an advertiser.

Alternative Caller ID: Advertising Campaign Specific Phone number—a static caller ID number such as 800-555-1234 that represents the specific advertised phone number (advertising campaign phone number); Fixed Caller ID Number Mask—a static telephone number used for a grouping of calls or advertising campaigns, e.g., a fixed caller ID number used by a warm call transfer call center for all or a designated category or group of their transfers; and Restricted or Blank Caller ID—the caller ID phone number is blank and may show Restricted as the caller ID name.

Several key limitations exist with the current state of caller ID transmission relating to the selling of phone calls across multiple competing call-buyers. Once a consumer's telephone number is displayed to a prospective call-buyer's telephone or telephone system, a record of that call attempt exists in the prospective call-buyer's telephone system call log. Therefore, the indication of interest and the means of contacting that consumer have been transmitted to the prospective call-buyer even if the prospective call-buyer does not answer the phone or answers the phone but does not press a key to accept the call. For example, if the call is offered to five (5) buyers, and is awarded and sold to one (1) of those five (5) buyers, the non-winning four (4) buyers have received the expression of interest from this consumer and the means of contacting the caller outside of the call supplier's call tracking system, therefore diluting the value to the 'awarded' buyer who purchased the call and preventing the call supplier from monetizing the follow-up callbacks the four (4) non-winning buyers may make to the caller outside of the call supplier's call tracking system.

If instead, the call supplier offers the call to only a single buyer or agent, then the caller is subjected to potentially long hold times or will be passed into voicemail. The shorter the hold time prior to connecting two parties, the higher the connection success rate, as defined by two parties engaged in conversation. The longer the hold time prior to connecting two parties, the lower the connection success rate. With longer hold times, the dropped call percentage increases as consumers who grow weary hang-up prior to being connected. Consumers who are connected faster are also in a better emotional state than those who wait on hold for a long time. Consumers who wait a long time on hold become fatigued and are less likely to engage in a productive sales conversation.

Another approach to solve for the dissemination of the consumer's expression of interest and the means of contacting the consumer is to use a static Alternative Caller ID telephone number. Several limitations of this approach exist. Call Reconciliation Accounting: The call-buyer does not have a straightforward means of discussing specific calls with the call supplier because multiple calls on call-buyer's call log share the same alternative caller ID number. This makes reconciliation of qualified call counts and the discussion and follow-up transactions related to the specific calls and the set of calls inordinately difficult. Further, when you want to allow multiple buyers to compete for the call, e.g. speed to press a key competitions, the problem of tracking activity becomes compounded. Call Geographic Distribution: If the call-buyer depends on using geography of the caller's telephone number, e.g., the area code, for the purpose of automated call distribution/routing to different geographically disparate sales offices or agents, the static caller ID alternative approach does not transmit any information about the geography of the caller.

SUMMARY OF THE INVENTION

Accordingly, and generally, it is the object of the present invention to provide improved systems and methods for call distribution.

In one preferred and non-limiting embodiment of the present invention, provided is a caller identification masking system that disaggregates the caller's unique telephone number from related important pieces of information used to track and geographically distribute the call. By doing so, calls can now be offered to multiple competing buyers or competing agents more freely so the lead time to find an available matching buyer or agent and connect that buyer or agent to the caller is greatly reduced.

According to a preferred and non-limiting embodiment of the present invention, provided is a computer-implemented method for distributing phone calls, comprising the steps of receiving or initiating a telephone call from or with a caller, the telephone call associated with caller identification information for the caller; generating, with at least one processor, masked caller identification information by masking a portion of the caller identification information; transmitting the masked caller identification information to a plurality of potential call-buyers; determining, with at least one processor, a call-buyer of the plurality of potential call-buyers to receive the incoming phone call; and storing the caller identification information with the masked caller identification information.

According to another preferred and non-limiting embodiment of the present invention, provided is a system for distributing phone calls, comprising at least one computer including at least one processor, wherein the at least one computer is in communication with a telephone network, the at least one computer programmed or configured to: receive or initiate a telephone call from or with a caller, the telephone call associated with caller identification information for the caller; generate masked caller identification information by masking at least a portion of the caller identification information; transmit the masked caller identification information to a plurality of potential call-buyers; award the telephone call to a call-buyer of the plurality of potential call-buyers; and store the caller identification information that was masked with the masked caller identification information.

According to a further preferred and non-limiting embodiment of the present invention, provided is a non-transitory computer-readable medium comprising program instructions that, when executed by at least one processor, cause the at least one processor to: receive or initiate a telephone call from or with a caller, the telephone call associated with caller identification information for the caller; generate, with at least one processor, masked caller identification information by masking a portion of the caller identification information; call a plurality of potential call-buyers in at least one lot, wherein calls to call-buyers in a single lot are initiated substantially simultaneously, and wherein calls to call-buyers in multiple lots are staggered in time; transmit the masked caller identification information to the plurality of potential call-buyers; determine, with at least one processor, a call-buyer of the plurality of potential call-buyers to receive the incoming phone call; and store the caller identification information with the masked caller identification information.

According to yet a further non-limiting embodiment, provided is a computer-implemented method for dynamically calculating call-buyer rankings in a call distribution system, comprising the steps of receiving or initiating an telephone call from or with a caller; determining, with at least one processor, a pool of potential call-buyers to rank for distributing the telephone call, wherein each call-buyer of the pool of potential call-buyers is associated with a plurality of parameters; sorting, with at least one processor, the pool of call-buyers into a priority list based at least partially on at least one parameter of the plurality of parameters for each call-buyer; and transfer the telephone call to a call-buyer selected based on the priority list. In non-limiting embodiments, the method may further include the step of determining, with at least one processor, at least one weight for each call-buyer based at least partially on the plurality of parameters associated with each call-buyer, wherein the pool of call-buyers is sorted into the priority list based at least partially on the at least one weight for each call-buyer.

Further, in non-limiting embodiments, the method for dynamically calculating call-buyer rankings may include a plurality of parameters for each call-buyer that comprise a targeted percentage of the calls within a period time, and the pool of call-buyers may be is ranked based at least partially on achieving the targeted percentage of calls for each call-buyer. Further, in some examples, the pool of call-buyers may be sorted by normalizing the targeted percentage of calls value for each call-buyer that is qualified and available to receive the call; calculating a call gap based at least partially on the normalized targeted percentage of calls value for each call-buyer, a time period, and a number of calls within the time period; and ordering the pool of potential call-buyers based at least partially on the call gap for each call-buyer. In even further embodiments, the plurality of parameters for each call-buyer comprises a targeted percentage of the calls within a period time, and the pool of call-buyers is ranked based at least partially on achieving the targeted percentage of calls for each call-buyer. The plurality of potential call-buyers may also be identified based at least partially on at least one of the following: a price-per-call, a real-time auction for the call, or any combination thereof. Additionally, determining the call-buyer to receive the telephone call may comprise ranking the plurality of potential call-buyers, where the call-buyers are called in lots, and where the calls initiated to the call-buyers in a lot are initiated substantially simultaneously, and wherein the calls initiated to call-buyers in different lots are staggered in time.

The method for dynamically calculating call-buyer rankings may further comprise determining, with at least one processor, a pool of potential call-buyers to rank for distributing the telephone call, where the call-buyer that connected with the same caller is excluded from the pool of potential call-buyers offered the opportunity to receive said second telephone call connection with the same caller. The computer-implemented method of claim 1, wherein receiving or initiating a second telephone call from or with the same caller comprises determining if a call-buyer was previously and firstly connected with said caller and if said first connection occurred within a specified trailing time duration, connecting said call buyer exclusively again with the same call-buyer.

In a further non-limiting embodiment, provided is a computer-implemented method for assembling a list of potential call-buyers in a call distribution system, comprising the steps of receiving or initiating an telephone call from or with a caller; and determining, with at least one processor, a pool of potential call-buyers from among a list of call-buyers pre-screened by the call-seller to meet minimum service quality standards. In some embodiments, the pool of potential call-buyers to be offered the call is pre-selected by the call-seller to meet minimum service quality standards. Further, the pool of potential call-buyers to be offered the call is pre-selected by the caller online. The pool of potential call-buyers to be offered the call may also be pre-selected by the caller through an interactive voice response menu system. The pool of potential call-buyers to be offered the call is pre-selected by the caller online or through an interactive voice response system, wherein the potential call-buyers are sequentially called and connected with the caller until such time as all pre-selected call-buyers have either been connected or the caller has stopped the process by pressing a key into an Interactive Voice Response menu. Further, the pool of potential call-buyers to be offered the call is pre-selected by the call-seller, where the potential call-buyers are sequentially called and connected with the caller until such time as all pre-selected call-buyers have either been connected or the caller has stopped the process by pressing a key into an Interactive Voice Response menu.

In a further non-limiting embodiment, provided is a computer-implemented method for improving the telephone call answer rate when calling a lead: sending an Short Message Server (SMS) or Multimedia Messaging Service (MMS) text message in advance of receiving or initiating a telephone call from or with a caller, where the SMS or MMS text message greets the lead and informs them who will be calling in response to their inquiry, from what telephone number said call will be coming and what phone number to call directly if caller prefers to directly dial the call-buyer at another time. Also, the SMS or MMS text message is sent from a pool of numbers such that the selected number matches the area of the lead's telephone number. Further, the SMS or MMS text message body includes a telephone number where the number is selected from a pool of numbers such that the selected number matches the area code of the lead's telephone number.

In a further non-limiting embodiment, provided is a computer-implemented method for receiving and distributing phone calls, comprising the steps of receiving or initiating a telephone call from or with a caller, taking a voice telephone message from the caller; generating, with at least one processor, distributing that message to one representative or call-buyer who first becomes available to receive said message and connecting said representative or call-buyer directly to the caller.

In yet a further non-limiting embodiment, provided is a computer-implemented method for receiving and distributing phone calls, comprising: receiving or initiating a telephone call from or with a caller, querying said caller with options to determine when a return call should be attempted via interactive voice response system; presenting the time options from among the list of as soon as possible, morning, mid-day, afternoon, evening, or selecting a specific time of day; wherein the system registers and confirms said caller's return call time request; wherein the system facilitates a call between the caller and the called party at said specified time.

Further, in non-limiting embodiments, the caller leaves a telephone voice recording to go along with the time of day for return call request. Also, the caller's selected time confirmed and reminders may be setup for the caller and called party using a set of the following methods: SMS or MMS text message, email, calendar meeting invitations, and telephone call confirmation. The optional audio message may be delivered to the called party in concert with the caller's time of day for return call request.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1A:
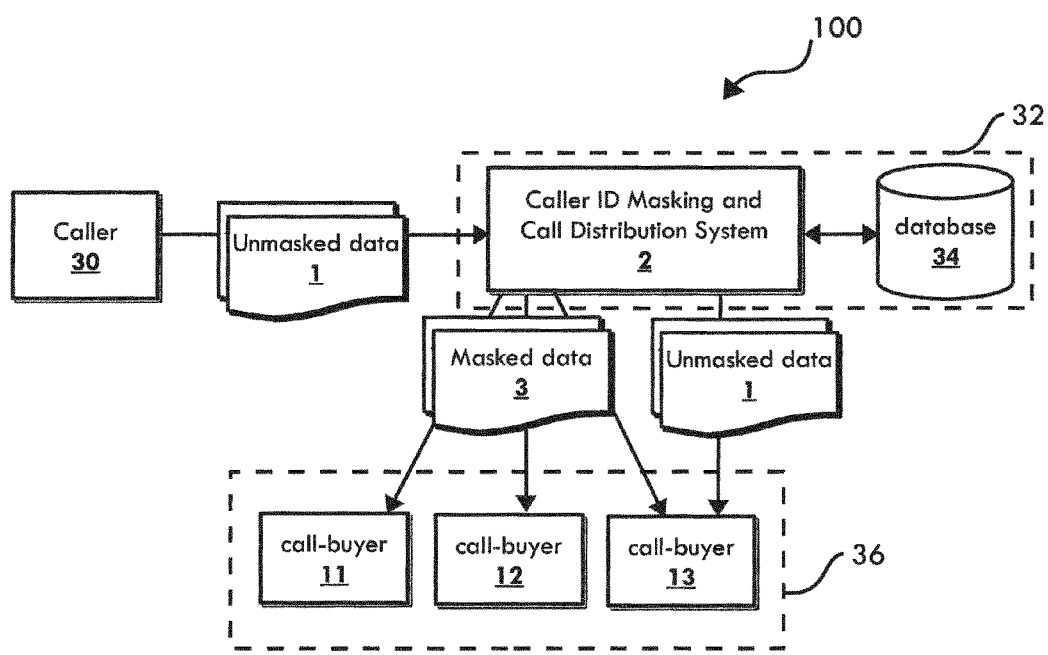
FIG. 1A is a diagram showing a telecommunications system according to the principles of the present invention.

As used herein, the terms "communication" and "communicate" refer to the receipt or transfer of one or more signals, messages, calls, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible.

In preferred and non-limiting embodiments, provided are methods of improving the connection success rate and decreasing the hold time on inbound calls from prospective clients into sales organizations, for both direct client-dialed calls and for both blind call transfer-style and warm call transfer-style calls originated by call center qualification and transfer agents. Non-limiting embodiments involve the use of call routing, caller ID telephone numbers, passing data along with telephone calls, call-seller protection through caller identity management, non-exclusive rate-shopping to exclude previously sold buyers from the distribution pool, exclusive buyer protection mode, and multi-buyer distribution. Multi-buyer distribution with "speed to press 1", speed to keypress, speed to answer or similar competitions decrease hold times, improve the connection success rate, and the emotional character of the exchange between the customer and the awarded sales or customer service person. Non-limiting embodiments of the present invention also relate to additional features pertaining to call scheduling, automated facilitation of said scheduled calls, and advances in intelligent abandonment through automated call queuing.

Referring now to a preferred and non-limiting embodiment of the invention, provided is a caller identification masking system that enables a call-supplier to offer a call to one or more competing call-buyers by using a unique caller ID mask for each call or for each caller. The caller's actual telephone number is withheld from the potential call-buyers at the time when the call is offered to them. Therefore, if the call-buyers do not accept the call and/or are not awarded the call, they have no means of contacting the caller outside of the call supplier's call distribution system. The actual contact information is withheld until either a viable connection or a sale of the call occurs. The resulting unique caller ID telephone number mask becomes a unique identifier for the call or caller in the initial data transactions between the call-supplier's call distribution system and the call logging and related tracking systems of the potential call-buyers and the awarded call-buyer.

Referring now to FIG. 1A, a telecommunications system 100 is shown according to a preferred and non-limiting embodiment. A caller 30 may be an individual or entity that is calling a telephone number hosted by the platform 32. The platform 32 may include one or more computers and databases for receiving and distributing telephone calls from callers 30 to a pool 36 of one or more potential call-buyers. For example, the platform 32 may include a caller ID telephone number masking and call distribution system 2, including one or more computers, including memory, processors, and/or the like, and software applications programmed or configured to receive a signal that a telephone call is received, and process information relating to the telephone call. The caller ID masking and call distribution system 2 may be in one location or, in other embodiments, the components may be distributed in different locations. The caller ID telephone number masking and call distribution system 2 may be in communication with a database 34 including caller ID information, unmasked data matched with corresponding masked data or identifiers, or other like data useful for implementing the telecommunications system 100.

With continued reference to FIG. 1A, the telephone call initiated by the caller 30 may include data 2, or such data 2 may be provided by a service provider, identifying the caller 30. This caller ID information may include a telephone number, name, address, and/or any other identifying information that is transmitted from the caller 30 or is otherwise available through a service provider. Caller ID information may also be looked-up in third-party databases once at least a portion of such information can be identified. The caller ID masking and call distribution system 2 receives the identifying data 1 and processes it to generate masked data 3. The masked data 3 is transmitted to a plurality of competing call-buyers 11, 12, 13. The system 2 may then determine which call-buyer to award the telephone call to, and provide the unmasked data 1, or at least a portion thereof, to the call-buyer 13 awarded the call. It will be appreciated that, in some embodiments, the masked data 3 may include the unmasked data 1 in an encrypted or otherwise concealed form. In other embodiments, the identifying data that is masked is stored on a database 14 and must be retrieved and separately provided to the call-buyer 13 awarded the call.

As used herein, the term "telephone call" may refer to any voice communication initiated over a telecommunications network including, for example, plain old telephone service (POTS), voice-over-IP (VOIP), and other like communication methods. It will be appreciated that various means of audio communication may be utilized.

The unique caller ID mask may act as a key that is used to update the call-buyer's systems of record at the appropriate times with the real contact information and any associated meta-data that is collected prior to the call connection. In one non-limiting embodiment, the caller ID name cannot be identified by the prospective call-buyers because they do not have the actual caller's telephone number. The caller's actual telephone number is only presented to the specific call-buyer or agent who is awarded the call, i.e., gets connected to the caller, either at the time the connection/award occurs or at later time once a call duration milestone has been reached, e.g., when the call connection duration reaches a specified or predetermined duration (for example, "X" seconds) indicating that a qualified call has occurred and the related billable/sale event has occurred.

As used herein, the terms "call-buyer", "call-buyers", "service provider", and "service providers" may refer to any entity or agent that purchases phone calls for non-branded category phone calls, or brand-specific or company-specific advertisement phone calls. Non-branded category phone calls may include calls from consumers seeking insurance, tax debt resolution, student loan consolidation, mortgage refinances, reverse mortgages, education, solar power, social security disability representation, plumbing, flooring, home security systems, psychic services, life insurance, auto insurance, medical insurance, other insurance, assorted legal services, and/or the like, in response to category advertisements as opposed to company-specific advertisements, which are offered to competing providers of the given product or service. These competing providers may be pre-approved participants meeting minimum quality ratings thereby comprising a curated list by the call seller or network owner. Further the competing service providers may be selected by the caller him or herself online or via designation through interactive voice response on the call. Brand-specific or company-specific advertisement phone calls may be offered to multiple competing salespeople who are all representatives of the same brand.

The source of the phone calls can be, for example, consumer initiated inbound calls to an advertised number, automated outbound calls with prerecorded messages, warm call transfers, and blind transfers. Automated outbound calls with prerecorded messages may involve the lead pressing "1" or some other key or sequence to be connected with a call-buyer, after which the call-buyer competition is staged. Warm call transfers may occur when a consumer and a transfer agent connect to a call-buyer, and the transfer agent introduces the consumer to the call-buyer. Blind transfers may occur where a transfer agent qualifies and passes consumers into a competition, where the consumer is then directly connected to the awarded call-buyer without any introduction from the transfer agent.

When a call is being offered to multiple competing call-buyers, the call-supplier may add a telephone keypad key-press requirement in order to award the call to a live person (e.g., a "With Verify" mode, as opposed to a "No Verify" mode that does not have such a requirement). Doing so avoids transferring the caller into a specific call-buyer's telephone routing system hold queue or their voicemail answering system.

The telephone number can be masked using any number of algorithms and methods. The telephone number may be represented as a string, integer, multi-character array, or in any other type of data structure. The telephone number can then be processed by an algorithm that manipulates some or all of the digits and/or characters, generating masked caller ID information. Those skilled in the art will appreciate that such algorithms may be implemented in various ways.

When potential call-buyers need information about the geographic location of a caller (i.e., city, state or zip code) to correctly route the call to the appropriate sales office, service office, or licensed broker, call-buyers typically depend on the using the caller's phone number within their internal call distribution mechanism (commonly referred to as an ACD or Automatic Call Distributer). Therefore, in these situations, restricting the caller ID telephone number, using a static caller ID telephone number, or otherwise preventing the transmission of the identity of the caller, can prove troublesome. In non-limiting embodiments, the call-seller can preserve the area code of the caller origin. Furthermore the call-seller can preserve the area code and 3-digit telephone number prefix or exchange of the caller's actual telephone number.

Non-limiting embodiments of the present invention enable new ways of selling phone calls by call-sellers to call-buyers by allowing simultaneous and overlapping call-seeks or queries to be made to multiple potential call-buyers' phones and phone systems using a unique caller ID telephone number that provides sufficient information for call tracking, call logging, and unique leads being created in lead management and customer relationship management (CRM) systems, but without sharing of the highly valuable unique identifying contact information of the caller until it is supposed to be shared either at the moment of call award/connection or the moment of sale. Non-limiting embodiments of the present invention also provide for a method of transmitting sufficient information for call tracking, reconciliation, and dispute resolution. Further, non-limiting embodiments may provide for the asynchronous unmarking/updating of the correct lead record in multiple call and lead tracking systems.

Being able to poll multiple competing call-buyers or agents for availability and acceptance of the call brings at least two important and related advantages: being able to connect a caller to a sales or service agent much faster leading to higher overall connection rates stemming from fewer calls dropped by consumers who grow weary and hang-up prior to being connected; and better quality conversations leading to higher sales from consumers who are connected faster because they are in a better emotional state than those who wait on hold for a long time.

In a non-limiting embodiment, the area code of the caller's telephone number is preserved followed by a 7-digit lead identification number, a 0+6-digit lead identification number, or the like. Moreover, the area code may be identified and obtained from matching lead data but might be different from the caller's telephone number. For example, if the caller is calling about refinancing his property in Pittsburgh, Pa., but his phone number is associated with a New Jersey area code, the system may match the caller to the customer's data record, but use an area code associated with said property, such that the call can be properly routed to state licensed hunt groups within a pool of potential call-buyers. Additionally, the area code can trigger the correct display of the caller's general geography on the recipient's phone system or the city/state and zip can be accurately transmitted using a data protocol to a web or softphone, or to a hardware phone using the Session Initiation Protocol (SIP).

Figure 1B:
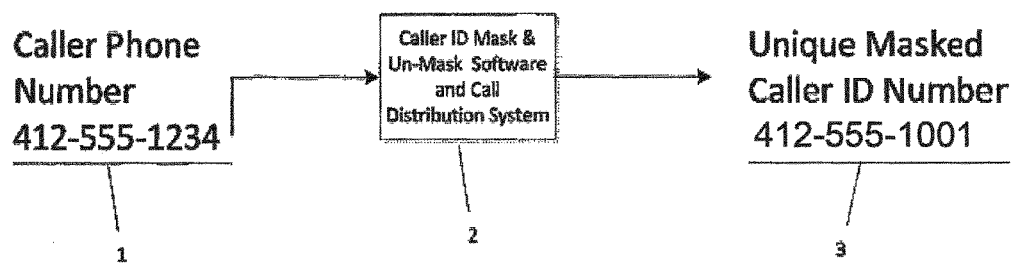
FIG. 1B is a diagram showing the caller's phone number coming into the system and being assigned a unique masked caller ID number, wherein the area code and telephone number prefix or exchange of the caller's phone number is preserved, according to the principles of the present invention.
Figure 1C:
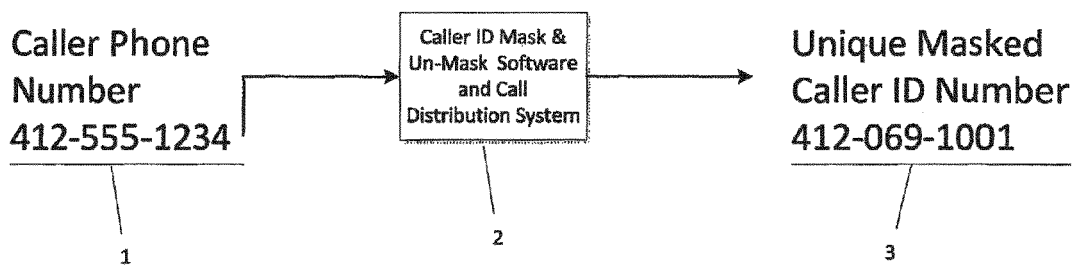
FIG. 1C is a diagram showing the caller's phone number coming into the system and being assigned a unique masked caller ID number, wherein the area code of the caller's phone number is preserved, according to the principles of the present invention.

As shown in FIG. 1C, and according to a preferred and non-limiting embodiment, the caller's phone number 1 is transmitted into the caller ID masking and call distribution system 2 and, based on this data, the unique caller ID mask 3 is generated. In non-limiting examples, the caller ID masking and call distribution system 2 may include one or more computers running one or more software applications. The various components of the system 2 may be located together or distributed remotely. For example, caller ID masking software may execute on one or more computers and be programmed or configured to accept an unmasked number and output a masked number, or to accept a masked number and output an unmasked number. The system 2 may also include one or more databases including an index of masked and related unmasked numbers, a call distribution system, and other hardware and/or software components.

With continued reference to FIG. 1C, the area code of the caller's telephone number 1 (e.g., "412") is preserved in the resulting caller ID mask 3. The caller ID mask 3 can be configured in this way to communicate the caller's area code so that the potential call buyers can internally route the call based on geography and apply the 7-digit mask to the remaining numbers. The 7-digits may use a sequential integer derived from an internal lead identification number that identifies the unique call in the caller ID masking and call distribution system 2. The 7-digits provide 9.9-million unique numbers before repeating within an area code and as such should suffice for all practicable lead reconciliation needs. Alternately, a static area code may be used and followed by a 7-digit lead identification number.

Referring to FIG. 1B, and according to a non-limiting embodiment, the area code and the telephone number prefix or exchange may be preserved from the caller's phone number 1 after being processed by the caller ID masking and call distribution system 2. As shown, the unique caller ID mask 3 may include an identifier for the last-four digits, and the original area code and telephone number prefix or exchange of the telephone number 1.

In non-limiting embodiments, additional or fewer digits may be masked. For example, only the last four (4) digits may be masked, preserving the first six (6) digits including the area code and the telephone number prefix or exchange (e.g., "412-555"). The telephone number prefix or exchange (e.g., "555") may be used to specify an additional level of geographic area or region specificity for use in geo-routing by call-buyers. Further, certain telephone carriers may experience difficulties with a telephone number prefix or exchange that begins with a zero (0), which may be the case when using a 7-digit lead identification number (e.g., 412-0XX-XXXX). This may cause certain telephone carriers to block these numbers as non-callable numbers.

The advantages of the call distribution system include, without limitation and as an example, the withholding of the caller's contact information until a viable connection or sale of said phone call occurs. Fewer calls are wasted on call buyers who are not prepared to receive the call, and the call can be beneficially routed to an available call-buyer. This increase in the call supplier's connection rate and reduction of disputes over failed connections and rejected calls makes the call selling process more efficient and has the potential to lower the price of the calls for the call buyers. These unique masked caller ID telephone number features of non-limiting embodiments of the present invention maintain the benefits of call tracking systems and the associated data integrations between call routing systems and lead management systems and customer relationship management (CRM) systems. The unique caller ID mask provides the key between the systems and this key can then be used to update the call-buyers' systems of record at the appropriate times with the real contact information and any associated metadata that has been collected prior to the call connection.

Figure 2:
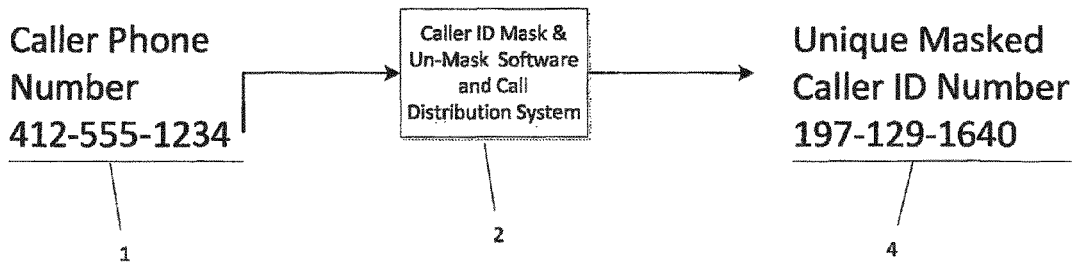
FIG. 2 is a diagram of the system, wherein the area code of the caller's number is not preserved, according to the principles of the present invention.

As shown in the non-limiting embodiment depicted in FIG. 2, the caller ID mask may use the entire 10-digit integer (for U.S. telephone numbers). This embodiment yields 9.9-billion unique numbers before repeating.

Figure 3:
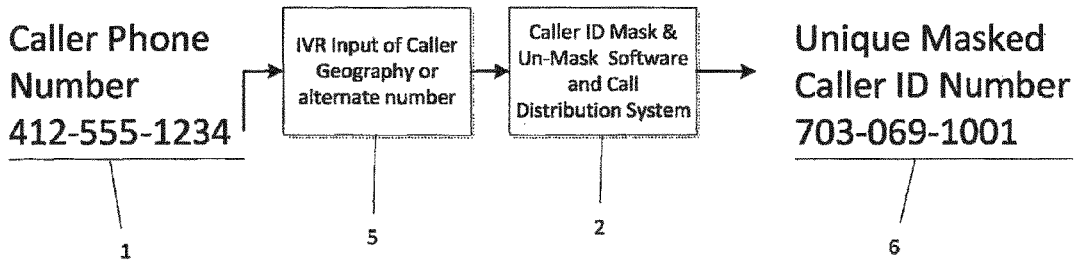
FIG. 3 is a diagram of the system, wherein an interactive voice response prompt is provided to the caller or to a transfer agent before proceeding into the caller ID masking process, according to the principles of the present invention.

In FIG. 3, an interactive voice response (IVR) menu 5 is presented to the caller or to a -call transfer agent before proceeding into the caller ID masking and call distribution system 2. The IVR menu 5 can be used to accept the caller's telephone number, and then apply the caller identification masking system to the entered number. Further still, the IVR 5 can be used to gather a geographic code such as a zip code or state, and use this entered information to select the appropriate area code or correct area code and telephone number prefix or exchange to use in the formulation of the unique caller ID mask. In FIG. 3, the unique caller ID mask 6 has a different area code that was entered in the IVR menu 5.

Figure 4:
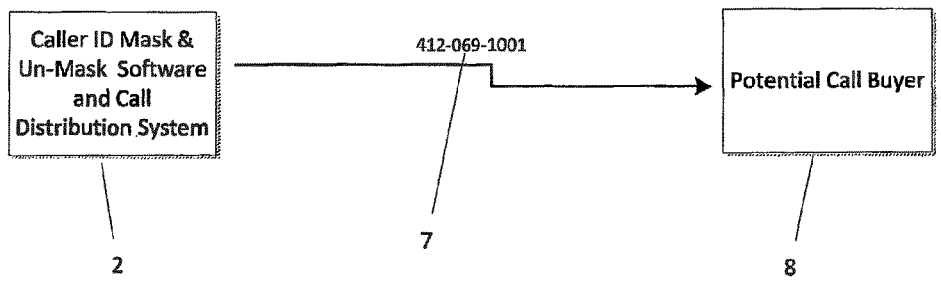
FIG. 4 is a diagram of the system that shows the masked caller ID being presented to a potential call-buyer or agent's telephone or telephone call routing system, according to the principles of the present invention.

FIG. 4 shows the call distribution system 2 transmitting the caller ID mask 7 to a potential call-buyer's phone or automated call distributor 8 according to a non-limiting embodiment.

Figure 5:
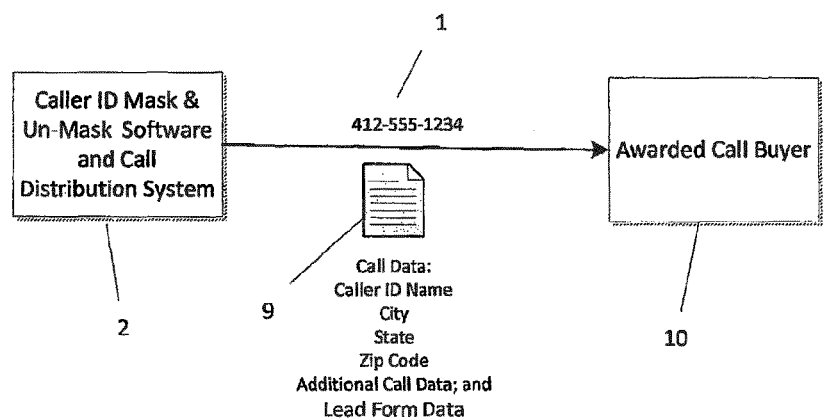
FIG. 5 is a diagram of the system performing the un-mask operation, revealing the true phone number of the caller and associated data, according to the principles of the present invention.

FIG. 5 shows the call distribution system 2 performing the un-mask/data reveal operation according to a preferred and non-limiting embodiment. The caller ID masking and call distribution system 2 presents the caller's true information containing the caller's actual phone number 1, and related identifying call information and lead form information 9 (e.g., caller ID name, city, state and zip code where the phone number is registered, call duration (once the call has ended), a link to the call recording, lead contact information with full address, alternate numbers, and answers to qualifying questions that may have been captured through an online self-service form, through an IVR (interactive voice response menu system), or by a call center agent), to the awarded buyer 10.

In non-limiting embodiments, when a call-buyer is awarded a call (e.g., at the time of the award), or when the call duration threshold for a qualified call sale occurs (e.g., at the time of the sale), the caller ID number and any associated identifying data, e.g., caller ID name, and the city, state and/or zip code where the caller's telephone number is registered, etc., can be unmasked in several ways. The process of unmasking the caller's identifying information includes, but is not limited to:

1. Via an electronic post into the buyer's customer relationship management software, lead management software, or other related tracking system, such as Google Analytics at the time of award or at the time of sale;

2. Via email transmission;

3. Via SMS text transmission;

4. Via an electronic update post, wherein the initial post at the time of award can be made using the masked number to create the lead record in the buyer's CRM and then this lead record can be updated with the actual caller's identifying information at the moment when the call duration reaches the qualified call duration threshold;

5. Via update messaging to the buyer's web browser phone, soft-phone, or SIP phone to update the phone's display;

6. At the moment of award before connecting the call, the telephone number can be spoken to the buyer/agent using text-to-speech; and/or 7. Via a screen pop up dialog box within the buyer's CRM, by opening a new browser tab or updating a browser web frame within an existing tab or triggering a pop-up, modal lightbox, or the like.

Figure 6:
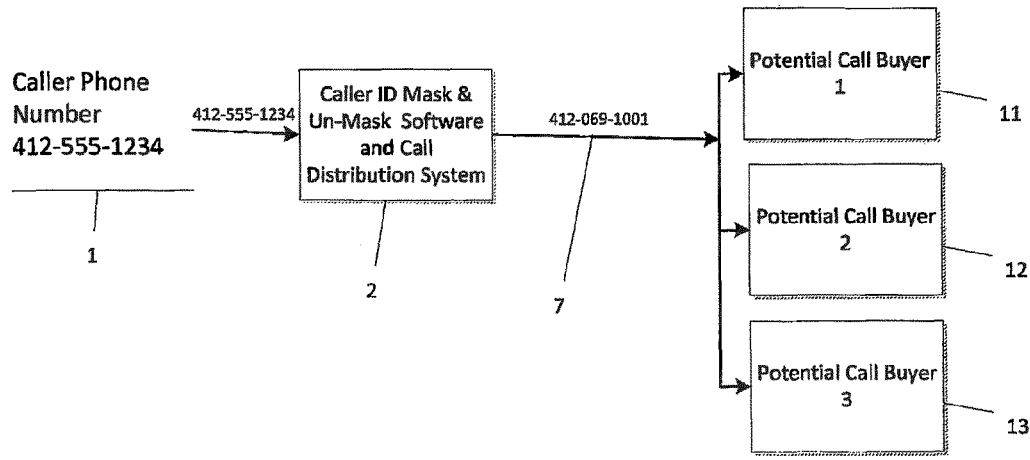
FIG. 6 is a diagram of the system, wherein multiple potential call-buyers or agents are offered a call at the same time and all of the potential call-buyers are presented with the unique masked caller ID number, according to the principles of the present invention.

FIG. 6 illustrates a non-limiting embodiment in which the caller ID masking system and call distribution system 2 is used to offer a single call to multiple competing call-buyers, typically from different organizations, Potential Call-Buyer One 11, Potential Call-Buyer Two 12 and Potential Call-Buyer Three 13. Each of these call-buyers 11, 12, 13 is presented with the masked caller ID 7 number. This embodiment is also applicable with competing sales agents within a single organization. In a non-limiting embodiment, the caller ID mask may be presented to only some of the competing call-buyers while the actual caller's telephone number may be presented to one or more call-buyers to accommodate system limitations for updating call lead records for said buyers.

Figure 7:
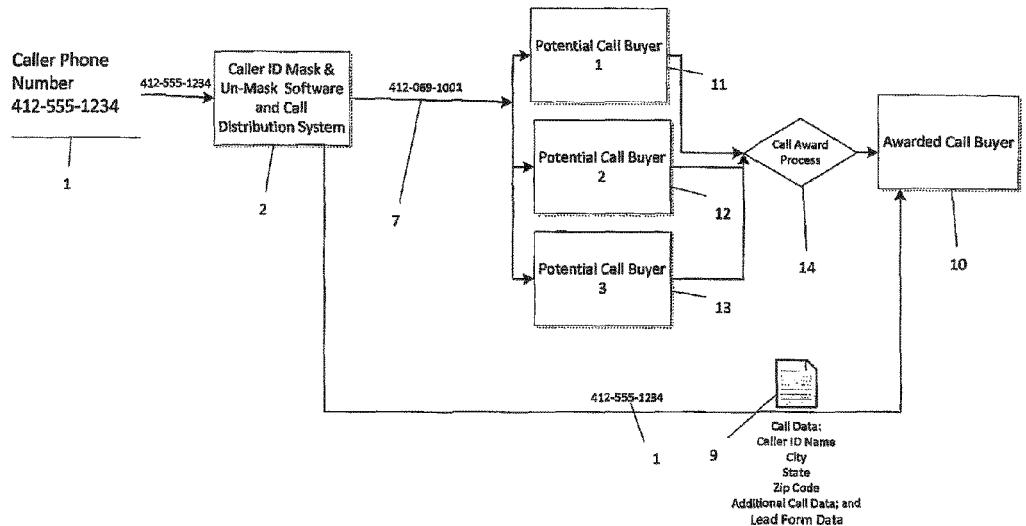
FIG. 7 is a diagram of the system showing the call being offered to multiple potential call-buyers and then being awarded to a single call-buyer who receives the unmasked caller information, according to the principles of the present invention.

FIG. 7 is a further, non-limiting embodiment. In FIG. 7, the call award process 14 and the Awarded Call Buyer 10 receiving the caller's phone number 1 and any associated call metadata and lead form data 9 are shown. In this embodiment, the unmask event can occur at the moment of award or at a later time. As illustrated, the masked caller ID 7 is sent to all three Potential Call Buyers 11, 12, 13 and a Call Award Process 14 is initiated. The Call Award Process 14 may include any number of software routines for determining which Potential Call Buyer 11, 12, 13 is the Awarded Call Buyer 10. Various methods are described herein for implementing the Call Award Process 14. Once the Awarded Call Buyer 10 is determined, the unmasked phone number 1 and data 9 is shown.

Figure 8:
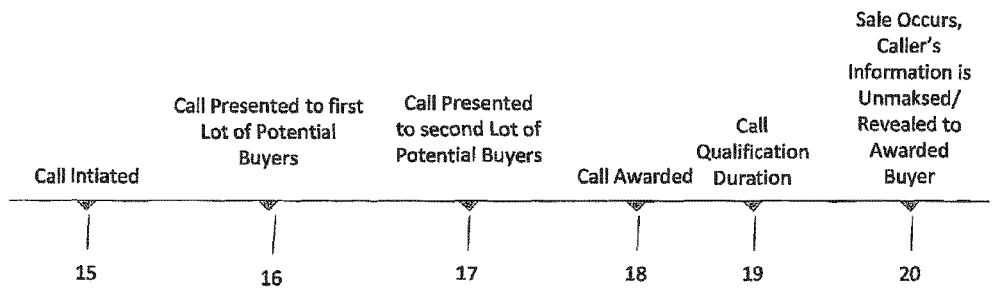
FIG. 8 is a diagram of the system showing the call being offered to more than one (1) lot of potential call-buyers at different points in time and a post-award call qualification duration that elapses before the caller's information is unmasked to the awarded call-buyer, according to the principles of the present invention.

FIG. 8 illustrates a timeline according to a non-limiting embodiment where a set of potential events are shown in sequence. A call is initiated 15, presented to a first lot of potential call-buyers 16, and then after some duration, presented to a second lot of potential call-buyers 17, and then the call is awarded to a call-buyer 18, and then another specific duration threshold is achieved where the connected two-party call becomes sufficiently long to be a qualified call 19, and then the unmask data reveal event occurs 20 to reveal the unmasked phone number and other data to the buyer's systems.

Figure 9:
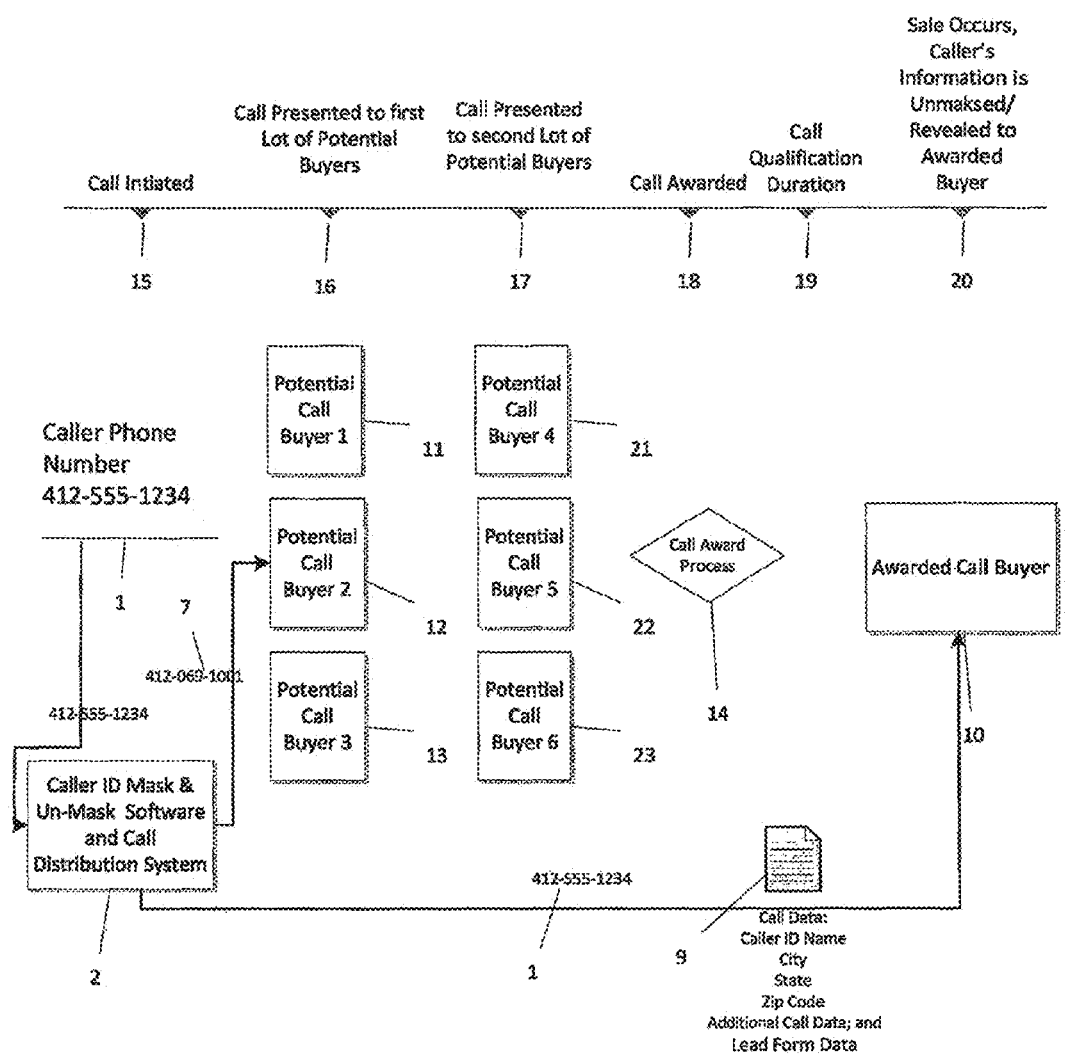
FIG. 9 is a diagram of the system that overlays the timeline from FIG. 8 on top of a flow diagram, according to the principles of the present invention.

FIG. 9 illustrates the timeline from FIG. 8, as discussed above, in addition to a flow diagram according to a preferred and non-limiting embodiment. In the illustrated example, there are multiple lots of call-buyers. A call qualification duration threshold value is used, such that the data reveal of the unmasked phone number and other data is withheld until the call achieves said duration threshold and becomes a billable call to the call-buyer. The duration threshold may be a predetermined value, input by a user, and/or dynamically changed based on other parameters. In other embodiments, the call duration threshold will be zero and hence the award/connection of the caller with the buyer is the qualified call/billable event and the unmasking event (e.g., data reveal) may occur at the moment of the connection and award.

In a call-buyer-call-seller marketplace, the call-seller may have advertised a telephone number the customer is responding to or may be attempting to transfer the caller from a call transfer agent. In either case, the call-seller depends on controlling the lead's contact information until such time as a sale can be made. When transmitting caller ID in a call-seller-call-buyer circumstance, the act of transmitting a potential customer's (lead's) telephone number may in fact grant a potential call-buyer at least two possible pieces of information: (i) information that the caller is potentially interested in the call-buyer's services; and (ii) means of identifying and contacting the customer. Therefore, obscuring the caller's phone number from a potential buyer's telephone system, e.g., a caller ID log, CRM call tracking log, etc., until such time as a positive person-to-person voice connection can be made adds value to the call-seller. In one non-limiting embodiment, the call-seller can mask the caller ID information until such time as either a positive connection or an otherwise billable event occurs (e.g., connections lasting "X" seconds, or "Y" unsuccessful call attempts have been made), at which time the caller's telephone and other information collected can be made available to the call-buyer.

In another non-limiting embodiment, using a selectively masked caller ID allows for correct routing, control of the value of the caller, and facilitates the near-simultaneous offer of the call to competing call-buyers and to competing sales agents within a call-buyer enterprise.

In non-limiting embodiments, caller ID entry may be used to match a live transfer call, which cannot pass the caller ID telephone number directly, with a data match option. For example, when a warm call transfer agent does not have the ability to transmit correct caller ID telephone number information, or when the caller is using a system that restricts the transmission of their actual telephone number, e.g., Magic Jack or caller ID blocking system users, this embodiment queries the caller to either enter the real phone number or the state and/or zip code for the area that they are calling about, and then uses that information to route the call properly. In this example, the entered information may or may not be used to match to existing customer lead data prior to routing the call.

For call centers and transfer agents who call a lead/customer or receive a call from a lead/customer and then transfer the lead to a receiving call center or agent, the intermediate call center or transfer agent may be unable to pass the phone number to the receiving call center/receiving agent. To solve this problem, the system may provide settings for the transfer numbers. In a first setting, the system may require the agent to enter and verify the lead's/customer's phone number into an IVR system prior to routing the call to the receiving call center/receiving agent. The entered and verified telephone number may then be presented to the call center/receiving agent directly or after a billable qualification duration threshold has been reached.

Additionally, in a second setting the system may check to ensure the lead's/customer's contract information is present in the system, upon receipt of such information and prior to allowing the call transfer to progress. This ensures that any lead data required for use in the call distribution process or required thereafter by the receiving call center/receiving agent is present, matched, and attached to the call prior to connecting the call to the receiving call center/receiving agent. With this setting enabled, the call distribution cannot progress without the presence of the matching lead data. It will be appreciated that various other settings may be provided with respect to such call transfers.

In non-limiting embodiments, call information may be combined or joined with one or more separately assembled data records. The data may be posted before or after the call into the system, which then facilitates the call routing. Further call-buyer purchase orders with daily qualified call caps (e.g., maximum number of calls the buyer is willing to accept and purchase for a given day of the week), price per qualified call, and customer data filters may be used. A customer data filter may include parameters with a specified value or range such as, for example, Refinance loans with Loan Amount>=X , Loan-To-Value<=Y, and Property addresses located in TX and MA. Those skilled in the art will appreciate that various parameters and combinations of parameters may be used to filter customer data. Such filters may be predetermined or entered/selected by a user through a graphical user interface.

In non-limiting embodiments, the true caller ID name, caller ID telephone number, and lead data may be revealed to an awarded call-buyer upon successful connection or upon a qualified billable event in real time, e.g., after a predetermined time period, wherein the methods of the reveal can be one or more of the following: the system can speak or display information to the awarded agent prior to connecting the call, a post into the call buyer's customer relation management (CRM) platform, a post with agent assignment into the call buyer's CRM, update of awarded agent's hardware phone display using SIP (or update of their web phone or soft phone using similar data exchange to change the caller ID information), an email with all relevant information, and/or SMS text(s) with relevant information.

In non-limiting embodiments, the awarded call-buyer or agent may be identified via entry of a unique ID or pin into an IVR system with verification, so that the lead post/reveal can be sent in via email and/or into the call-buyer/advertisers CRM pre-assigned to a specific agent. In other words, the lead may be submitted into the CRM pre-assigned with an identifier (e.g., agent=user@callerready.com) as part of the lead creation post. This protects the lead within the call-buyer's CRM from being routed and assigned to another agent.

In non-limiting embodiments, call distribution may be prioritized based on speed and/or an auction among call-buyers. For example, the system may require pressing "1," or some other key or sequence, to accept a call among call-buyers who are open and requesting matching calls. One of the benefits of a multiple call-buyer distribution approach is that it addresses issues concerning the speed of connection, thereby improving the connection success rate for the call-supplier and improving the emotional quality of the conversations that occur. This leads to better calls and more sales for the call-buyers. The consumer (caller) also benefits because they receive assistance in a timely manner. Further, these competitions can be run as auctions to yield the maximum net revenue for the call-supplier, wherein the call-buyer with the highest price-per-qualified call or effective price-per-qualified call is ranked first in the call order. The buyer with the second highest effective price per call is ranked second, and so on.

In non-limiting embodiments involving a real-time auction among call-buyers, the effective price-per-call may be calculated based on the price a buyer is willing to pay, and discounted by various factors such as, but not limited to, call-buyer specific return rate, rejection rate, percentage of qualified calls to connected calls (e.g., in situations where the connected call duration must last a specified duration or number of seconds to become a billable qualified call), acceptance rate of the calls offered, lead qualification filters (e.g., wherein the buyer is only purchasing calls when the lead meets certain criteria), the size of the call-buyer's overall order, and/or the strategic value of the call-buyer to the aggregator or call-supplier.

In non-limiting embodiments, various methods may be used to rank competing call buyers for an incoming call. For example, a quality score may be generated by at least one software application using various factors, variables, and/or other considerations. Such factors may include, for example, an effective cost-per-call, return rate, strategic priority, geography, lead data filters and values, return rate, ease of doing business, percentage of daily limit filled, order fill rate, concurrency limit utilization, historical offer-to-win rate, historical qualified billable call-to-awarded call rate, and/or the like. By normalizing such data and applying a normalized weighting to each of these factors, the system generates an overall ranking for each potential matching buyer. Similarly, a multivariate weighting process such as the Analytic Hierarchy Process may be used to derive weights for these component variables of the call-buyer quality score.

A generated call-buyer quality score may be dynamically adjusted based on ratings, performance metrics, strategic priority, call pacing goals and daily fill rate, as examples. Call Purchase Orders (e.g., agreements to purchase calls subject to certain constraints) may be analyzed for various factors, including office hours (the specific hours during which the buyer is willing to receive calls), limits (daily or hourly qualified call limits, and/or total qualified call limits on an order), concurrency (e.g., how many utilized lines/calls can the system make into a buyer's number at the same time; for example, 10-simultaneous calls maximum, only one call at any given time, unlimited, and/or the like), payout (e.g., what the call-buyer agrees to pay for a qualified call), effectiveness rate (e.g., the qualified call to award rate), return rate (e.g., percentage of calls matching the qualified call duration that the buyer requests to return/refund), and/or the like. There may be an automatic shut-off for a call-buyer (i.e., calls will no longer be offered) if the call-buyer misses all calls during a given time period, or if the call-buyer meets some other specified parameter. Orders may be tracked, and payments may be collected from call-buyers against any prepaid amounts. The system may generate invoices automatically based on the collected data.

An automatic shut-off for a call-buyer means the call-buyer failed to compete or accept calls during an agreed-upon period that they had stated on a submitted order. In other words, a call-buyer's purchase order agrees that the call-buyer will be open and accepting calls during a certain period and, starting at a time within that period, a predetermined number of calls are presented in a row where the call-buyer does not answer within an allowable/expected timeframe, e.g., their line is busy, the calls go into a queue and the buyer does not press "1" before a predetermined period of time, the calls are connected but all fail to reach a minimum qualification duration, etc. These signals specify that the call-buyer is not actually receiving calls properly when they said they would. Automatic shut-off pauses delivery in these situations and the incidence of automatic shut-off may be a negative factor in the quality score of a call-buyer.

In non-limiting embodiments, a number of distribution ranking modes may be selected by a user to control how calls are distributed to the call-buyers. For example, such distribution ranking modes include, but are not limited to, (1) a Straight Strategic Priority-Weight Rank mode, where a higher priority is a higher rank, (2) a Targeted Distribution Mix mode, (3) an Optimal Buyer Weighting mode, and (4) an Optimal Buyer Weighting mode with Targeted Mix and Variable Weighting. Various other modes, and combinations of modes, are possible.

As described above, various factors may be weighted to rank each of the call-buyers. First, the system may determine the potential call-buyers to rank based on whether their schedules are open, lines are available within their concurrency limits, not yet reached their daily call limits, not yet reached their purchase order limits, call matches their routing rules, and/or the like.

In a non-limiting embodiment, a trailing time period is determined during which the system tries to deliver calls based on the targeted distribution mix (e.g., last hour, 2-hours, 3-hours, 4-hours, 6-hours, 10-hours, 12-hours, 18-hours, 24-hours, 48-hours, 3-days, and/or the like). In order to calculate the relative proportion of calls delivered to any given call-buyer during a given time period, the system evaluates the proportion of calls delivered within the trailing time period. A goal of this embodiment is to satisfy as many call-buyers as possible by delivering the rate or call flow they are desiring without oversaturating or starving any given call-buyer for a time period when they have sales people awaiting calls.

Various methods, tools, and settings may be used to prevent unattended call delivery problems in non-limiting embodiments. For "No Verify" problem cases (e.g., where the system will award/connect the caller to a call-buyer or agent's phone number as soon as the call-buyer or agent's phone system answers, without having to press any keys), the system may provide an optional short call warning to turn a call-buyer off automatically when the most recent set of a predetermined number (e.g., "X") of calls received by that call-buyer lasted less than a predetermined number (e.g., "Y") of seconds, and send an email or other communication to prevent a closed call-buyer from ruining lead delivery effectiveness for the call-supplier. For "With Verify" cases (e.g., where a call-buyer or agent must use a telephone keypress verification or some other form of verification) an automatic pause call-buyer option may be provided for any call-buyer who has received a predetermined number (e.g., "X") of calls offered in a first highest ranked call-buyer position wherein the call-buyer is called prior to calling any other potential call-buyers and yet this call-buyer is not without winning any calls. In such cases, the system may automatically notify a call-supplier that the call-buyer is experiencing a problem and may need a different call routing configuration to actually win call competitions, e.g., initiate calls to this buyer with longer headstart and a headstart lot size of one (1) to get any calls, or that the call-buyer's system or office may be shut down.

The Straight Strategic Priority Ranking mode ranks call-buyers based on weights only, irrespective how frequently a given call-buyer is winning call competitions, e.g., no consideration is being made to attempt to award competing buyers a targeted share of the calls in a given time frame.

The Targeted Distribution Mix mode of ranking and fulfilling orders ensures all competing call-buyers are presented the opportunity to receive a minimum share of calls in a given timeframe. In this mode, each call-buyer group is assigned a targeted percentage of the call delivery, e.g., 10% of calls for call-buyer one, 20% of calls for call-buyer two, etc. The targeted distribution mix mode ranks matching call-buyers based on a difference between the targeted percentage of calls delivered minus the actual percentage of calls delivered to the given buyer during a trailing time period, and essentially ignores the other potential weighting factors. The buyer with largest difference is ranked first in the calling order. Typically, the targeted distribution mix refers to "qualified/billable calls" delivered within the timeframe, but it can also be based the number of "calls awarded" or the "calls offered". The "targeted distribution mix" variable may be normalized among available matching call-buyers. This can be done by summing the total number of available matching call-buyers targeted mix percentage, and then dividing each of the available matching call-buyer's targeted distribution mix by this sum to get the normalized target distribution mix for each call-buyer and finally calculating the gap between the normalized target distribution mix and the actual distribution mix and ranking from the highest difference to the lowest difference. Each time a call is received, the system can therefore find matching call-buyers, total them, normalize the weights, and rank the buyers accordingly. For example, three (3) matching available call-buyers each having a 10% targeted distribution mix can be normalized such that each receives 33% of calls.

With the Targeted Distribution Mix mode enabled, the system attempts to transfer a specific percentage of calls within a time period to each call-buyer based on the targeted distribution mix value for that call-buyer. The system will attempt to maximize the spacing between calls for each call-buyer to provide a steady delivery or pacing to each call-buyer instead of fulfilling each call-buyer sequentially. In other words, this method tries to smooth call delivery over time and avoid oversaturating any given call-buyer at any given time.

The Targeted Distribution Mix may then be calculated based on the largest calculated Call Gap value. The Call Gap may be calculated with the following equation: [Normalized Targeted Distribution Mix−Actual Distribution Mix] where the Actual Distribution Mix is (Connected calls within Time Period/Total Matching Calls within Time Period). When there are equal calculated Call Gap values, ties may be broken using the Optimized Buyer Weight and then, if still equal, Strategic Buyer Priority, and if still equal, the equal buyers may be randomized to force a rank among them.

Figure 10:
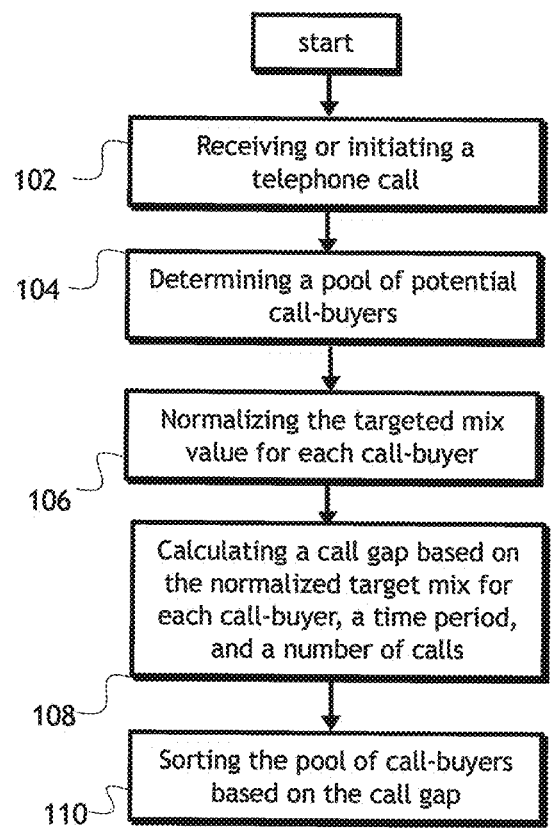
FIG. 10 is a flow diagram of a method for ranking call-buyers according to the principles of the present invention.

Referring now to FIG. 10, a flow diagram for a ranking process is shown according to a non-limiting embodiment. Here, the method starts at step 102 when a telephone call is received (e.g., an inbound call) or initiated (e.g., a system or operator-generated call). Next, at step 104, a pool of potential call-buyers for the telephone call is determined. As described herein, a number of factors may influence the determination of the pool of potential call-buyers. Next, at step 106, the targeted distribution mix values for the pool of potential call-buyers are normalized according to the methods described herein. Then, at step 108, a Call Gap for each call-buyer is calculated based on the normalized targeted distribution mix value, a time period, and a number of calls made in that time period by that call-buyer. As described herein, there are multiple other ways to calculate the Call Cap. Next, at step 110, the pool of call-buyers are sorted based at least in part on the Call Gap for each call-buyer, using a suitable sorting algorithm.

A Round Robin mode of ranking (i.e., an even cadence model) is the Targeted Distribution Mix mode described above when all available call-buyers have equal targeted distribution mix values. If this occurs, there will be even cadence among the ranking of call-buyers for each call. This mode effectively ranks call-buyers by the last time they were awarded a call because the normalized targeted distribution mix quantity is the same for each call-buyer.

An Optimal Buyer Weighting ranking mode fulfills orders in order to optimize profits. The Optimized Buyer Weight may be calculated with the following equation: (Effective Price-Per-Call*normalized Gap to (Daily or Total) Order Limit Percentage*normalized Strategic Buyer Priority); where Effective Price-Per-Call is equal to [Price*(1−Return Rate)*(1−Qualification Rate)]. Various other equations may be used. The call order of the call-buyers may then be ranked based on this calculated Optimized Buyer Weight factor.

In the Optimal Buyer Weighting mode, the Gap to the Targeted Distribution Mix may be substituted for the Gap to Order Limit Percentage. Further, the Optimal Buyer Weighting mode may incorporate weighting of the equation components. For example, a user may provide various weights to different factors to build their own algorithm for optimizing the distribution of calls. Call-sellers can therefore adjust the weights of different variables in response to call distribution feedback they receive from call-buyers. It will be appreciated that users may provide weights in various different ways, including entering input or manipulating selectable options on one or more graphical user interfaces.

An algorithm in a preferred and non-limiting embodiment of the Optimal Buyer Weighting mode of ranking may execute the following equation to calculate an Optimized Buyer Weight: (Effective Price-Per-Call*normalized Gap to (Daily or Total) Order Limit Percentage * normalized Strategic Buyer Priority*normalized Targeted Distribution Mix); where Effective Price-Per-Call is equal to [Price*(1−Return Rate)*(1−Qualification Rate)]. Weights can be provided to each of these variables so that the targeted distribution mix could potentially carry more weight than the Gap to Order Limit percentage. The Strategic Buyer Priority Weight may be set to zero (0) unless it is needed. The call-buyer order may then be ranked based on the calculated Optimized Buyer Weights.

Potential call-buyers may be dynamically weighted for each phone call. In non-limiting embodiments, the weights of the variables or call-buyers can be directly changed and/or input by a user. In non-limiting embodiments, an even Round Robin distribution method may be used based on how long it has been since the call-buyer was previously offered a call. In other embodiments, the call-buyer ranking originate from a third-party system and be passed into the call distribution system. Once a ranking is either determined or received, an optimization between awarding the call to the highest ranked, soonest-available call-buyer/agent can be staged in real-time by implementing the initiation of calls to each ranked call-buyer/agent with successive call lots and using intentional delays between initiating calls to competing call-buyers in said call lots. The delays allow the system to provide higher-ranked call-buyers with a better chance at winning the call competition by providing one or more call-buyers with a headstart.

In this manner, a call can be awarded to the first call-buyer/agent to answer or, in a non-limiting embodiment, the first call-buyer/agent to 'Press a key', e.g., 'Press 1' or some other keypress/sequence, on their telephone keypad. The key-press affirmatively indicates that the call-buyer/agent is ready and able to accept the call, and prevents connecting a caller into a voicemail system or a hold queue. Once a call-buyer/agent is awarded the call, the other lines are immediately hung-up on. In another embodiment, in the case of a second overlapping call that comes in prior to the other lines being hung-up on, the remaining competitor buyers/agents can be immediately be placed into competition for the second call.

In another non-limiting embodiment, and as described above, the call can be awarded to the highest ranked call-buyer/agent who presses a key within a predetermined number (e.g., "X") of seconds or time period (a 'wait for better call-buyer/agent' time period) from the moment first call-buyer/agent presses a key. If the highest ranked call-buyer/agent is also the first call-buyer/agent to press a key, the competition may be immediately ended and the caller will be connected with said highest ranked caller-buyer/agent. Once the 'wait for better call-buyer/agent' period elapses, the call is awarded to the highest ranked buyer who pressed a key and the other lines are hung-up on. In another non-limiting embodiment, during the 'wait for better call-buyer/agent' the available call-buyers can increase their bids or buy the call immediately by agreeing to a specified higher price than their baseline bid on their call order.

There are numerous ways to stage call competitions between multiple competing call-buyers and/or agents. For example, a headstart mode may be used where the top-ranked call-buyer is called first and, after a predetermined number (e.g., "X") of seconds, the rest of the matching call-buyers are called. The maximum number of ranked call-buyers called per caller can be set to control call distribution costs. As another example, a headstart mode may dynamically size the headstart lot and maximum included call-buyers/agents to call in order to optimize the speed of connection against the call distribution costs. For example, with ten (10) ranked buyers in the competition, the headstart lot size might be set to two (2) buyers who are called first and then, after five (5) seconds, an additional lot of five (5) are called, and then after another five (5) seconds, the final lot of five (5) buyers are called. The call competition can end as soon as any of the buyers presses a key to win the call.

The dynamic aspect of the headstart lot size and associated lot delays is based on optimizing the process so that the fewest number of call-buyers are called to connect a call at the highest effective price within a predetermined number (e.g., "X") of seconds. For example, if goal is to sell the call at the highest price within four (4) rings or about 15 seconds, the system can adjust Effective Price Per Call [Buyer's price per qualified call*(1−the Buyer's qualified call return rate) *(qualified calls for this buyer/connected calls for this buyer)] by multiplying it by the frequency the Buyer presses 1 within 15 seconds of call initiation. So, if a Buyer always presses 1 within 15 seconds of call initiation, the Time Adjusted Effective Price Per Call=100%*Effective Price Per Call. And if a Buyer historically only presses 1 within 15 seconds of being called 50% of the time, the Time Adjusted Effective Price Per Call=50%*Effective Price Per Call. Then using the probabilistic Time Adjusted Effective Price Call to determine the call order for the competition will yield highest Effective Price Per Call on average within 15 seconds, provided the call competitions are allowed to run for 15 seconds.

Through these time-to-connect metric adjustments to the Effective Price Per Lead, the call-buyer rankings are further modified. Then, by varying the headstart lot size to be larger or smaller, the system can optimize toward the highest connection rate possible within a predetermined number (e.g., "X") of seconds, at the highest effective price, with the fewest number of competing buyers in the competition (e.g., at the lowest call distribution cost).

In other non-limiting embodiments, the lot sizes can be constant and staggered with a uniform delay between successive lots. In a non-limiting embodiment, an overflow call-buyer of last resort may be used to ensure connections are always made. This buyer of last resort is characterized as a buyer who will buy a large number of calls but at a lower price point. In other non-limiting embodiments, if a call fails to route within a specified competition within the allotted competition time, the system can loop and retry the matching buyer pool a second time, or it can use IVR to offer the caller an opportunity to be called back when a representative becomes available (e.g., intelligent abandonment).

In non-limiting embodiments, a ranked pool of potential call-buyers or agents are dynamically passed-in or otherwise supplied from a ranking system in real-time. For example, the ranked pool may be provided in substantially real-time when a call is first received. In this example, the call distribution system may query the ranking system for the list of ranked potential call-buyers or agents, and the call distribution system uses the returned list to implement the competition among the call-buyers or agents for distributing the call. Further, the call distribution system may gather additional information via an IVR system and provide that information to the ranking system for use in developing the matching ranked set of call-buyers/agents. It will be appreciated that this ranking system may be hosted by a third-party, and may also be hosted by the call distribution system.

In non-limiting embodiments, the call distribution system may match the caller to existing lead information based on the caller's phone number and then provide this information to the ranking system for use in developing the list of ranked call-buyers. In other non-limiting embodiments, the call distribution system may be configured upon receiving a form fill data lead to first seek and award this data lead to a call-buyer/agent, prior to connecting the awarded call-buyer/agent on an outbound call to the lead (i.e., initiate the call to the call-buyers/agents first), or it can occur when a lead is called by the system first, prior to initiating the call to the call-buyers/agents.

In the either case, the information about the call connection can be made available to the lead in a web browser, including information and links related specifically to the awarded call-buyer/agent. This may include, for example, updating an on-screen call status monitor with the awarded buyer/agent information, links, and/or pictures, and providing the lead with the awarded buyer/agent's caller ID telephone number information on screen so the lead can recognize who is calling them. This method of providing more information about who is calling promotes the answer rate and connection rate between leads and call buyers/agents. Once a call is connected, the awarded party, call duration, link to a recording, and other call metadata can be transmitted back to the ranking system or some other third-party system for tracking, billing and additional analysis.

In non-limiting embodiments, once a ranking is dynamically developed, an auction and/or competition can be further staged by the use of lots. Lots, as used herein, refer to the group of call-buyers who are called simultaneously or in rapid succession. Lot sizes can range from one to many. The lot sizes can vary with each lot and can vary dynamically based on the number of available potential buyers and other factors.

In non-limiting embodiments, a call-buyer may indicate that they are available to receive calls by setting their office hours, having an open order, and/or having their status set to "Active." However, the call-buyers still answer the phone and press a key, e.g., press 1, to accept the call.

As already described, in a competition and/or auction, the winner can either be the first buyer to press "1" or some other key, sequence, or input, or it can be structured so that the winner is the highest ranked buyer to press "1" or some other key or input within a predetermined delay (the "Wait for Better Buyer Delay"). For example, if the highest ranked buyer presses "1" first, the competition is immediately ended and the winner immediately awarded the call. If a non-highest ranked buyer presses "1" first, they can still lose the competition if a higher ranked buyer presses "1" within the "Wait for Better Buyer Delay" duration, e.g., a specified duration or number of seconds from the time the first buyer to press "1." In non-limiting embodiments, the present invention allows for buyers to be able to increase their bids during the "Wait for Better Buyer Delay" period. For example, if a call-buyer presses "1" and has a lower bid than the current highest bidding call-buyer, the system may offer that call-buyer the opportunity to increase their bid by a specified amount to jump to the highest position. The system can also affect several rounds of bidding to seek the maximum revenue for the call. These additional real-time adjustments to win the call outright are communicated by the call-buyer to the system via telephone keypad key presses, via voice recognition, and/or via on-screen software controls.

In a non-limiting embodiment, in the "Wait for Better Buyer Delay" scenario described above, the system may allow a call-buyer to increase their bid price to buy the call outright and end the auction immediately for either (i) their maximum predetermined bid; (ii) an offered price in real time, e.g., "win this call now for $Z"; or (iii) for an additional dollar amount, e.g., "win this call now for an additional $Y." These additional real-time adjustments to win the call outright are communicated to the system via telephone keypad key presses, via voice recognition, and/or via on-screen software controls.

In non-limiting embodiments, lot structures may be optimized. For example, the system may use multiple goals to optimize the lot sizes, delays, and/or sequencing. These goals can include, but are not limited to:

1. Connection Qualification Rate, i.e., qualified calls divided awarded calls;
2. Net Revenue, e.g., selling the call for the highest price net of expected returns/rejection rates;
3. Caller Hold Time, e.g., minimizing the caller hold time or keeping it below a threshold, e.g., X seconds maximum hold time;
4. Geography, e.g., the approximated distance between the caller and the service/product supplier;
5. Quality, e.g., the qualitative ranking of call-buyer based on user reviews or other third party available ratings systems;
6. Priority, e.g., the strategic value of the buyer to the call aggregator or call supplier;
7. Purchase Order Size, e.g., the relative size of the open orders;
8. Purchase Order Fill Rate, e.g., the fill rate against the daily, weekly and monthly goals for the call-buyers; and
9. Call distribution costs, e.g., minimizing the expense of the call-buyer seek process incurred by the calls made to the non-winning call-buyers.

In a preferred and non-limiting embodiment, time-based qualified billing may also be used. Further, call routing may be prioritized based on an effective cost-per-call. As already described, a real-time auction may be used to award the call to the highest bidder among available call-buyers/agents. In such an auction process, a time-based buffer (e.g., a specified duration) may be used to wait for a higher ranked call-buyer or sales agent prior to awarding the call. The bid rankings may be modified by return rate, close rate, or tenure of the agent.

In non-limiting embodiments, provided are methods and systems to repeat call distributions. Settings may be provided to protect leads sold to a given call-buyer or agent, and subsequent calls from the same lead may be re-routed to a previously assigned call-buyer/agent. In an alternate non-limiting embodiment, repeat calls from the same lead are routed to different call-buyers/agents and specifically excluding a previously-billed call-buyer or a previously connected but not billed call-buyer. Further, in non-limiting embodiments, customers may be provided with the ability to reconnect to a previously connected call-buyer, or to rate shop and contact a new service provider, at the caller's direction. In some non-limiting embodiments, calls may be queued for multi-buyer and single company distribution. IVR systems may be used to collect and qualify data. IVR may also be used to handle overflow calls and provide the caller with the ability to intelligently abandon the call. In non-limiting embodiments, a voice message may be received and then delivered to the awarded call-buyer and/or sales agent prior to initiating the outbound courtesy call back to the caller.

In non-limiting embodiments, overflow IVR is used as a transfer agent and presents callers with retry and/or intelligent abandonment options. For example, when a call distribution fails because no matching call-buyers are available in a timely manner, this embodiment can provide retry attempts to re-query the pool of potential service providers/call-buyers, or it can offer to hold the caller's place in queue until such time as a matching available service provider is located, prepared for the call, and the outbound follow-up call to the lead is facilitated.

In non-limiting embodiments, an automated after-hours call-handling method may be used to greet callers. For example, a greeting may be played and the caller may be presented with a number of options for specifying a call back time on the next available business date presented. Such options may include, but are not limited to, (1) as soon as possible; (2) morning; (3) afternoon; (4) evening; (5) or a user-selected specific time within the business' stated office hours. Upon confirming a selection, an SMS text message and/or email confirmation may be transmitted to the lead. Then, at a specified time when the office re-opens, a pre-call reminder warming SMS text message may be sent out a minute, or at some other predetermined time interval, before the first call attempt, e.g., a pre-call warming SMS to improve the answer rate.

In a non-limiting embodiment, the system initiates the connection with a call into the agent/representative/call-buyer first, presents information about the lead's request for the callback, and then connects the agent/representative/call-buyer on an outbound call to the lead. In an alternate non-limiting embodiment, the system makes an attempt to reach the lead on the telephone first, prior to connecting with a representative/agent/call-buyer. In this case, up to three (3) (or some other predetermined value) initial outbound call attempts with pre-recorded messages are made, separated by three (3) minutes (or some other predetermined time period) in the first ten (10) minutes (or some other predetermined time period) asking the lead to press '1' to speak with their representative.

In non-limiting embodiments, the system may be used to schedule calls. For example, a voice message may be received and delivered to an awarded call-buyer prior to speed-to-respond features. For example, once a voice mail is received by the system, the system may then continue seeking a call-buyer who wants to take the courtesy call-back. The awarded call-buyer then has the ability to hear the voicemail prior to initiating the outbound call. Further, a direct date and time may be received via an IVR system for a follow-up call. In examples, a time-of-day category may be selected by the caller through an IVR system or otherwise. A return call may be automatically queued for as soon as possible within allowable calling hours. Further, the return call may be facilitated through a call-buyer competition, an auction or through a sales-agent-first calling process to award the call prior to initiating the outbound call leg to the customer. In some examples, the customer may be called first to ensure that they are still available for the call prior to facilitating the scheduled call assignment through a call-buyer competition, an auction or through a sales agent distribution mechanism. In non-limiting embodiments, Express Written Consent (EWC) may be obtained through opt-in IVR and optional voice recording, affirming a positive consent to receive an automated callback using a pre-recorded voice message. This feature facilitates compliance with the Telephone Consumer Protection Act (TCPA).

In another preferred and non-limiting embodiment, the system may be used in connection with call marketing lead generation, including connecting the caller with the right sales person as fast as possible, and capturing inbound calls. Features of the presently-invented system include a variety of processes, such as concierge services through real-time "speed to press '1'" competitions and auctions, standardization of live transfer campaigns, ensuring the caller is qualified and that the lead data is joined with the phone call data for clean transfers every time without the problems associated with unqualified callers and missing data, and optimization of the marketing spend for each agent with internal call distribution based on product, state licensure, agent performance, and daily agent calls caps.

Figure 11:
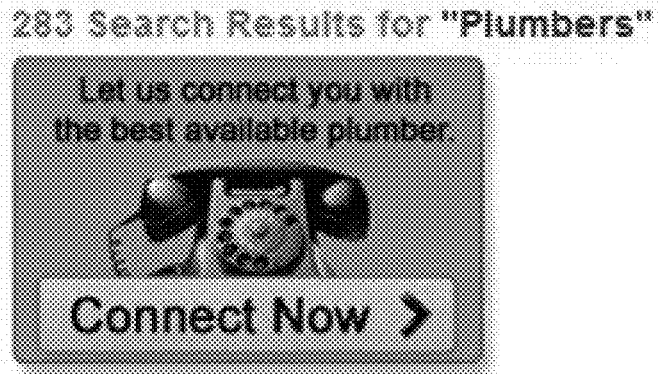
FIG. 11 shows an advertisement on a search page according to the principles of the present invention.

Referring now to FIG. 11, an advertisement on a search page is shown according to a preferred and non-limiting embodiment. This allows a user to connect with the best available service provider from a pre-screened minimum rated list of potential service providers. For example, the system may identify a ranked list based on geography and specialty from among pre-screened providers. Pre-screened providers may be required to meet a minimum generally accepted rating on a commercially available rating system, like the Better Business Bureau and/or user reviews. The system queries a service provider availability checking service to determine who is available to speak with the caller right now and completes the phone connection between the member and the best available pre-screened service provider. In this manner, consumers can be directly connected with service providers matching their search parameters who are available to talk at that moment. The system reduces delays related to voice messages, emails, and answering services. Also, providers receive phone calls and client information from highly interested potential clients at their moment of need. These calls can be trackable, demonstrating a significant return on investment (ROI) on the providers' marketing spend for participation in the call-buyer network.

Figure 12:
FIG. 12 shows a graphical user interface with user-selected service providers according to the principles of the present invention.

Referring now to FIG. 12, a graphical user interface (GUI) is shown according to a preferred and non-limiting embodiment. This GUI shows service providers that have been selected by a user, such that the providers can call the user in an organized fashion that is managed through the GUI. This functionality may also be driven directly from an audio session with a user who controls the settings and manages the calls via an IVR system. As an example, the service providers shown in the GUI of FIG. 12 may be connected to the user in the order shown.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A computer-implemented method for dynamically distributing calls to a plurality of competing call-buyers, comprising:

receiving a telephone call or a request for a telephone call from an individual, or initiating a telephone call with an individual;

ranking, with at least one processor, a plurality of potential call-buyers into a priority order based at least partially on at least one parameter of a plurality of parameters associated with each call-buyer;

transmitting, with at least one processor, an offer for the telephone call to at least a subset of call-buyers of the plurality of potential call-buyers;

receiving a plurality of responses to the offer from a plurality of responsive call-buyers, each response associated with a response time; and determining, with at least one processor, at least one selected call-buyer to award the telephone call to based at least partially on the priority order and the response time to accept the call from each responsive call-buyer.

2. The computer-implemented method of claim 1, further comprising awarding and transferring the telephone call to or awarding and initiating a telephone call with the at least one selected call-buyer.

3. The computer-implemented method of claim 1, further comprising adjusting a minimum possible response time for at least some of the plurality of responsive call-buyers based at least partially on the priority order, wherein the at least one selected call-buyer is determined based on the adjusted minimal possible response time.

4. The computer-implemented method of claim 1, wherein the at least one selected call-buyer is determined based at least partially on a highest ranked call-buyer to affirmatively respond within a predetermined time period of receiving a first affirmative response to the offer from a first affirmative responsive call-buyer.

5. The computer-implemented method of claim 1, wherein the at least one selected call-buyer is determined to be a call-buyer that increases a bid for the telephone call within a predetermined time period of receiving a first response to the offer from a first responsive call-buyer.

6. The computer-implemented method of claim 1, further comprising determining, with at least one processor, the plurality of potential call-buyers for distributing the telephone call to based at least partially on at least one factor comprising at least one of the following: whether a schedule for a call-buyer is open, whether a line is available within a call-buyer's concurrency limits, whether a call-buyer has reached their daily call limits, whether a call-buyer has reached their purchase order limits, whether the call matches a call-buyer's routing rules, a ratio of calls billed to calls awarded, a ratio of calls offered to calls awarded, or any combination thereof.

7. The computer-implemented method of claim 6, wherein the at least one factor is obtained from a third-party database.

8. The computer-implemented method of claim 1, further comprising determining, with at least one processor, at least one weight for each call-buyer of the plurality of potential call-buyers based at least partially on the plurality of parameters associated with each call-buyer, wherein the plurality of potential call-buyers is ranked into the priority order based at least partially on the at least one weight for each call-buyer.

9. The computer-implemented method of claim 1, wherein ranking the plurality of potential call-buyers into the priority order comprises generating, for each call-buyer of the plurality of potential call-buyers, a quality score based at least partially on at least one of the following factors: an effective cost-per-call, a return rate, a strategic priority, a geography, lead data, a return rate, an ease of doing business, a percentage of daily limit filled, an order fill rate, a concurrency limit utilization, a historical offer-to-win rate, a historical qualified billable call-to-awarded call rate, or any combination thereof.

10. The computer-implemented method of claim 9, further comprising adjusting the quality score for each call-buyer based at least partially on at least one of the following factors: a rating for a call-buyer, a third-party rating system, a user review, a ratio of calls billed to calls awarded, a ratio of calls offered to calls awarded, a call return rate, a strategic priority for a call-buyer, a call pacing goal and fill rate, or any combination thereof.

11. The computer-implemented method of claim 1, wherein the at least one parameter comprises a targeted percentage of calls.

12. The computer-implemented method of claim 11, wherein the plurality of potential call-buyers are ranked into the priority order based at least partially on whether each call-buyer achieved the targeted percentage of calls within a time period.

13. The computer-implemented method of claim 11, further comprising:
normalizing the targeted percentage of calls for each call-buyer, resulting in a normalized target percentage for each call-buyer; and
determining a call gap for each call-buyer based at least partially on the normalized target percentage, a time period, and a number of calls within the time period, wherein the plurality of potential call-buyers are ranked into the priority order based at least partially on the call gap for each call-buyer.

14. The computer-implemented method of claim 11, wherein each call-buyer is associated with an actual percentage of calls received during a time period, further comprising determining a difference between the actual percentage of calls received during the time period and the targeted percentage of calls for each call-buyer, wherein the plurality of potential call-buyers are ranked into the priority order based at least partially on the difference for each call-buyer.

15. The computer-implemented method of claim 1, further comprising:
determining a plurality of subsets of call-buyers of the plurality of potential call-buyers based at least partially on the priority order; and
initiating a call to each call-buyer of a first subset of call-buyers before any calls are initiated to a second subset of call-buyers, wherein the first subset of call-buyers comprises at least one call-buyer, and wherein the at least one selected call-buyer is determined from the first subset of call-buyers or a subsequent subset of call-buyers.

16. The computer-implemented method of claim 1, further comprising:
determining a plurality of subsets of call-buyers of the plurality of potential call-buyers based at least partially on the priority order, each subset of call-buyers comprising at least two call-buyers; and
initiating a plurality of calls to a first subset of call-buyers substantially simultaneously, wherein the at least one selected call-buyer is determined from the first subset of call-buyers or a subsequent subset of call-buyers.

17. The computer-implemented method of claim 16, further comprising:
(a) initiating a next plurality of calls substantially simultaneously to a next subset of call-buyers if the at least one selected call-buyer is not yet selected from the first subset of call-buyers, the second plurality of calls initiated at a predetermined time after initiating a previous plurality of calls to a subset of call-buyers; and
(b) repeating step (a) until a call-buyer is selected.

18. The computer-implemented method of claim 1, further comprising:
determining that a previous telephone call with the individual was previously received or initiated and that a call-buyer was previously connected to the individual; and excluding the call-buyer that was previously connected to the individual from the plurality of potential call-buyers.

19. The computer-implemented method of claim 1, further comprising determining that a previous telephone call with the individual was previously received or initiated and that a call-buyer was previously connected to the individual within a predetermined time period from receiving or initiating the telephone call, wherein the call-buyer that was previously connected to the individual within the predetermined time period is determined to be the selected call-buyer for the call.

20. The computer-implemented method of claim 19, further comprising receiving an indication from the individual of whether the individual wants to speak to the call-buyer that was previously connected to the individual, wherein the selected call-buyer is selected based at least partially on the indication.

21. The computer-implemented method of claim 1, wherein each response of the plurality of responses is at least one of a key press and a pick-up of a telephone line.

22. The computer-implemented method of claim 1, wherein an interstitial agent initiates a transfer of the call to the individual either with or without making an introduction between the individual and the selected call-buyer.

23. A computer program product for dynamically distributing calls to a plurality of competing call-buyers, comprising at least one non-transitory computer-readable medium including program instructions that, when executed by at least one processor, cause the at least one processor to:
receive a telephone call or a request for a telephone call from an individual, or initiate a telephone call with an individual;
rank a plurality of potential call-buyers into a priority order based at least partially on at least one parameter of a plurality of parameters associated with each call-buyer;
transmit an offer for the telephone call to at least a subset of call-buyers of the plurality of potential call-buyers;
receive a plurality of responses to the offer from a plurality of responsive call-buyers, each response associated with a response time; and
determine at least one selected call-buyer to award the telephone call to based at least partially on the priority order and the response time to accept the call from each responsive call-buyer.

24. The computer program product of claim 23, wherein the program instructions further cause the at least one processor to award and transfer the telephone call to or award and initiate a telephone call with the at least one selected call-buyer.

25. The computer program product of claim 23, wherein the program instructions further cause the at least one processor to adjust a minimum possible response time for at least some of the plurality of responsive call-buyers based at least partially on the priority order, wherein the at least one selected call-buyer is determined based at least partially on the adjusted minimal possible response time.

26. The computer program product of claim 21, wherein the at least one selected call-buyer is determined based at least partially on a highest ranked call-buyer to affirmatively respond within a predetermined time period of receiving a first affirmative response to the offer from a first affirmative responsive call-buyer.

27. The computer program product of claim 23, wherein the program instructions further cause the at least one processor to determine that a previous telephone call with the individual was previously received or initiated and that a call-buyer was previously connected to the individual within a predetermined time period from receiving or initiating the telephone call, wherein the call-buyer that was previously connected to the individual within the predetermined time period is determined to be the selected call-buyer for the call.

28. The computer-implemented method of claim 27, wherein the program instructions further cause the at least one processor to receive an indication from the individual of whether the individual wants to speak to the call-buyer that was previously connected to the individual, wherein the selected call-buyer is selected based at least partially on the indication.

* * * * *